United States Patent
Huang

(10) Patent No.: US 10,171,838 B2
(45) Date of Patent: Jan. 1, 2019

(54) METHOD AND APPARATUS FOR PACKING TILE IN FRAME THROUGH LOADING ENCODING-RELATED INFORMATION OF ANOTHER TILE ABOVE THE TILE FROM STORAGE DEVICE

(71) Applicant: MEDIATEK INC., Hsin-Chu (TW)

(72) Inventor: Chao-Chih Huang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 313 days.

(21) Appl. No.: 14/606,027

(22) Filed: Jan. 27, 2015

(65) Prior Publication Data
US 2015/0237353 A1    Aug. 20, 2015

Related U.S. Application Data

(60) Provisional application No. 61/941,571, filed on Feb. 19, 2014.

(51) Int. Cl.
*H04N 19/176* (2014.01)
*H04N 19/60* (2014.01)
*H04N 19/91* (2014.01)
*H04N 19/436* (2014.01)

(52) U.S. Cl.
CPC ........... *H04N 19/60* (2014.11); *H04N 19/436* (2014.11); *H04N 19/91* (2014.11)

(58) Field of Classification Search
CPC .................................................... H04N 19/176
USPC .................................................... 375/240.24
See application file for complete search history.

(56) References Cited

U.S. PATENT DOCUMENTS

| | | |
|---|---|---|
| 2006/0156204 A1 | 7/2006 | Lee |
| 2012/0140830 A1 | 6/2012 | Xu |
| 2013/0195175 A1* | 8/2013 | MacInnis ............. H04N 19/176 |
| | | 375/240.02 |
| 2013/0202051 A1* | 8/2013 | Zhou ................ H04N 19/00521 |
| | | 375/240.26 |

(Continued)

FOREIGN PATENT DOCUMENTS

| | | |
|---|---|---|
| CN | 1705373 A | 12/2005 |
| CN | 101325698 A | 12/2008 |

(Continued)

OTHER PUBLICATIONS

"The latest open-source video codec VP9—An overview and Preliminary results", Mukherjee et al., published 2013, pulled from ieee.com on Feb. 2, 2017.*

(Continued)

*Primary Examiner* — Jonathan R Messmore
(74) *Attorney, Agent, or Firm* — Winston Hsu

(57) ABSTRACT

A method for encoding a frame divided into a plurality of tiles includes: storing encoding-related information derived from blocks in a last block row of a first tile of the frame into a storage device; reading the encoding-related information from the storage device; and performing entropy encoding upon blocks in a first block row of a second tile of the frame based at least partly on the encoding-related information read from the storage device. The first block row of the second tile is vertically adjacent to the last block row of the first tile. The entropy encoding of the first block row of the second tile is started before entropy encoding of the last block row of the first tile is accomplished.

17 Claims, 6 Drawing Sheets

(56) References Cited

U.S. PATENT DOCUMENTS

| | | |
|---|---|---|
| 2014/0037017 A1 | 2/2014 | Lin |
| 2014/0247876 A1 | 9/2014 | Moriya |
| 2014/0355690 A1* | 12/2014 | Choi .................... H04N 19/176 |
| | | 375/240.24 |
| 2014/0362904 A1* | 12/2014 | Lim ....................... H04N 19/50 |
| | | 375/240.02 |
| 2014/0362922 A1 | 12/2014 | Puri |
| 2015/0229948 A1 | 8/2015 | Puri |
| 2015/0350652 A1 | 12/2015 | Nellore |

FOREIGN PATENT DOCUMENTS

| | | |
|---|---|---|
| CN | 103155556 A | 6/2013 |
| CN | 103518374 A | 1/2014 |
| WO | 2013109115 A1 | 7/2013 |

OTHER PUBLICATIONS

Huang, Title of Invention: Method for Performing Image Processing Control With Aid of Predetermined Tile Packing, Associated Apparatus and Associated Non-Transitory Computer Readable Medium, U.S. Appl. No. 14/542,666, filed Nov. 17, 2014.

* cited by examiner

METHOD AND APPARATUS FOR PACKING TILE IN FRAME THROUGH LOADING ENCODING-RELATED INFORMATION OF ANOTHER TILE ABOVE THE TILE FROM STORAGE DEVICE

CROSS REFERENCE TO RELATED APPLICATIONS

This application claims the benefit of U.S. provisional application No. 61/941,571, filed on Feb. 19, 2014 and incorporated herein by reference.

BACKGROUND

The present invention relates to encoding frame data, and more particularly, to a method and apparatus for packing (entropy encoding) a tile of a frame through loading encoding-related information (e.g., partition size information) of another tile above the tile from a storage device.

The conventional video coding standards generally adopt a block based coding technique to exploit spatial redundancy. For example, the basic approach is to divide the whole source frame into a plurality of blocks, perform prediction on each block, transform residues of each block, and perform quantization and entropy encoding. Besides, a reconstructed frame is generated in a coding loop to provide reference pixel data used for coding following blocks. For certain video coding standards, in-loop filter(s) may be used for enhancing the image quality of the reconstructed frame.

VP9 is an open and royalty-free video coding standard being developed by Google®. VP9 provides tiles for parallel processing, which is similar to that proposed in HEVC (High Efficiency Video Coding). However, in accordance with the VP9 coding standard, there are some dependencies among tiles vertically adjacent in a frame to be encoded. As a result, packing (i.e., entropy encoding) of these vertically-adjacent tiles in the same tile column cannot be done in parallel. Thus, there is a need for an innovative encoder design which is capable of packing (entropy encoding) vertically adjacent tiles of a frame in a parallel manner to thereby achieve enhanced encoding performance.

SUMMARY

One of the objectives of the claimed invention is to provide to a method and apparatus for packing (entropy encoding) a tile of a frame through loading encoding-related information (e.g., partition size information) of another tile above the tile from a storage device.

According to a first aspect of the present invention, an exemplary method for encoding a frame divided into a plurality of tiles id disclosed. The exemplary method includes: storing encoding-related information derived from blocks in a last block row of a first tile of the frame into a storage device; reading the encoding-related information from the storage device; and performing entropy encoding upon blocks in a first block row of a second tile of the frame based at least partly on the encoding-related information read from the storage device, wherein the first block row of the second tile is vertically adjacent to the last block row of the first tile, and the entropy encoding of the first block row of the second tile is started before entropy encoding of the last block row of the first tile is accomplished.

According to a second aspect of the present invention, an apparatus for encoding a frame divided into a plurality of tiles is disclosed. The apparatus includes a storage device, an encoding circuit, and a packing circuit. The encoding circuit is configured to store encoding-related information derived from blocks in a last block row of a first tile of the frame into the storage device. The packing circuit is configured to read the encoding-related information from the storage device, and perform entropy encoding upon blocks in a first block row of a second tile of the frame based at least partly on the encoding-related information read from the storage device, wherein the first block row of the second tile is vertically adjacent to the last block row of the first tile, and the packing circuit starts the entropy encoding of the first block row of the second tile before entropy encoding of the last block row of the first tile is accomplished.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
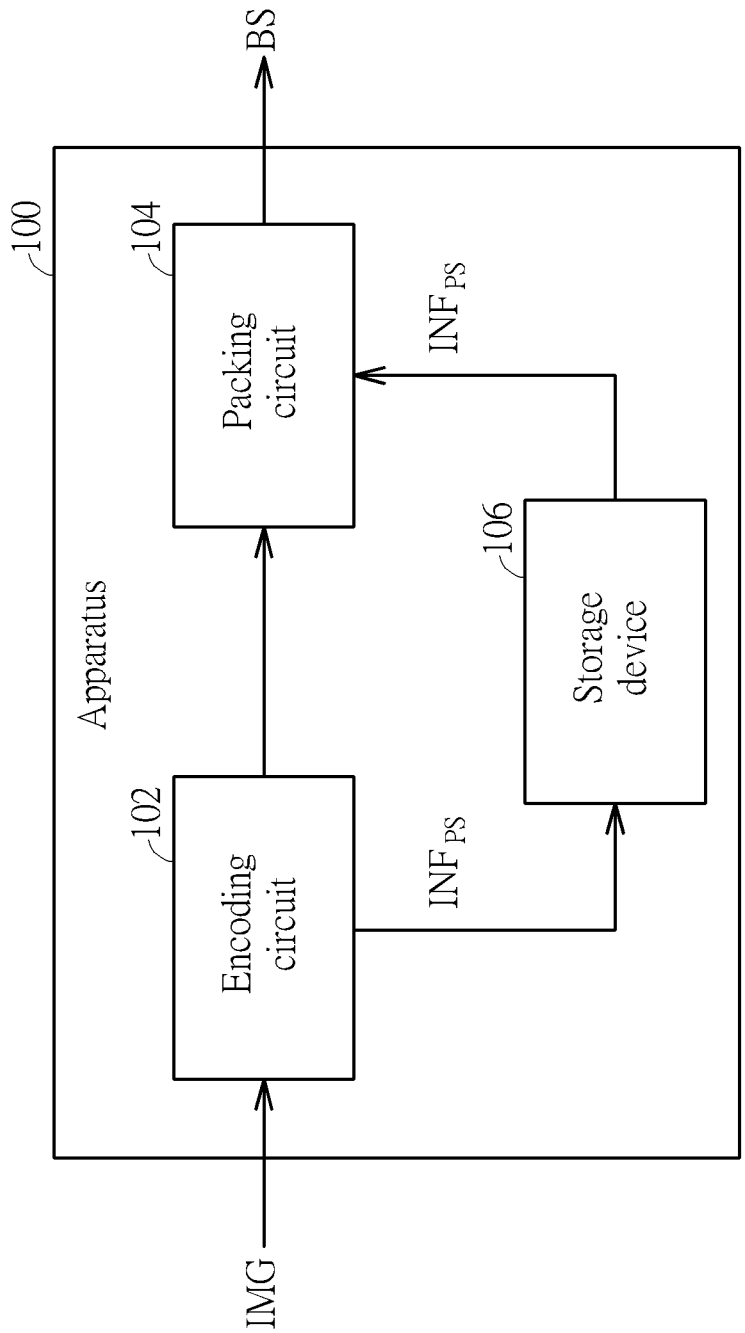
FIG. 1 is a diagram of an apparatus for encoding a frame according to an embodiment of the present invention.

FIG. 1 is a diagram of an apparatus 100 for encoding a frame according to an embodiment of the present invention. This apparatus 100 may comprise at least a portion (e.g., part or all) of an electronic device, such as at least a portion of a video encoder. For example, the apparatus 100 may comprise a portion of this electronic device (e.g. the video encoder), and more particularly, can be at least one hardware circuit such as at least one integrated circuit (IC) within this electronic device. In another example, the apparatus 100 can be the whole of this electronic device (e.g. the video encoder). In yet another example, the apparatus 100 may comprise an electronic system comprising this electronic device (e.g. an electronic system comprising the video encoder). Examples of this electronic device may include, but not limited to, a mobile phone (e.g. a multifunctional mobile phone), a tablet, and a personal computer such as a laptop computer or a desktop computer. To put it simply, any electronic device or electronic system using the proposed apparatus 100 falls within the scope of the present invention.

As shown in FIG. 1, the apparatus 100 may have an encoding circuit 102, a packing circuit 104, and a storage device 106 that is coupled to the encoding circuit 102 and the packing circuit 104. It should be noted that only the components pertinent to the present invention are shown in FIG. 1. In practice, the apparatus 100 may include additional components to achieve other functions. The encoding circuit 102 is configured to perform image coding, such as image encoding operations associated with tiling of a frame IMG. The encoding circuit 102 may divide the frame IMG into a plurality of tiles based on a selected tile partitioning layout, and may process the tiles in a raster scan order. The packing circuit 104 is arranged for performing packing (i.e., entropy encoding) to generate a bitstream BS. In a case where the frame IMG is divided into tiles based on the selected tile partitioning layout, the packing circuit 104 may pack processed data of each tile generated by the preceding encoding circuit 102 to output a corresponding bitstream.

In this embodiment, each of the encoding circuit 102 and the packing circuit 104 may be implemented using a dedicated hardware circuit. However, this is for illustrative purposes only, and is not meant to be a limitation of the present invention. According to some embodiments of the present invention, at least a portion of components shown in FIG. 1 (e.g. the encoding circuit 102 and/or the packing circuit 104) can be implemented with a processor running some program codes. For example, this processor can be a computer processor such as a central processing unit (CPU) or a graphics processing unit (GPU).

The present invention takes advantage of a two-stage encoding scheme to achieve parallelism of encoding multiple tiles vertically adjacent in a frame. Specifically, the encoding circuit 102 is arranged to perform a first-stage encoding flow, and the packing circuit 104 is arranged to perform the second-stage encoding flow, where each of the first-stage encoding flow and the second-stage encoding flow is applied to all blocks in the same frame IMG, i.e., the whole frame IMG. Considering a case where the apparatus 100 is used to generate the bitstream BS complying with the VP9 coding standard, the frame IMG may be divided into 64×64-sized blocks (or called superblocks). Hence, each of the first-stage encoding flow and the second-stage encoding flow is used to process all superblocks in the frame IMG. In other words, the encoding circuit 102 finishes processing all superblocks in the frame IMG before the packing circuit 104 starts processing all superblocks in the frame IMG.

Figure 2:
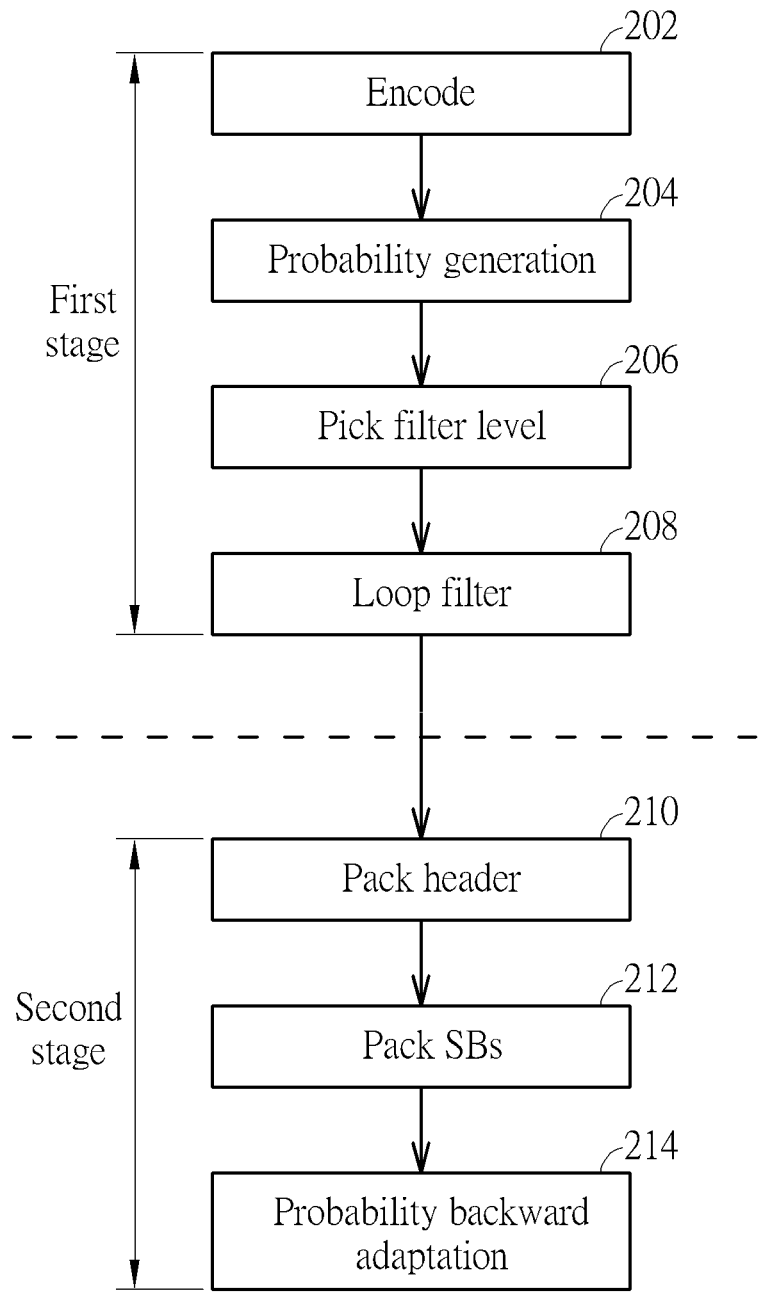
FIG. 2 is a flowchart illustrating a two-stage encoding scheme proposed by the VP9 coding standard according to the related art.

FIG. 2 is a flowchart illustrating a two-stage encoding scheme proposed by the VP9 coding standard according to the related art. The first-stage encoding flow includes steps 202, 204, 206, and 208, and the second-stage encoding flow includes steps 210, 212, and 214. Step 202 is performed to do motion estimation (ME), motion compensation (MC), transform (T), quantization (Q), inverse transform (IT), inverse quantization (IQ), tokenization, etc. After step 202 is accomplished, distributions of quantized coefficients/motion vectors/modes of the frame IMG are determined. In other words, occurrence of syntax elements can be determined.

Based on the syntax element distributions determined in step 202, step 204 is performed to calculate optimized probabilities to create a probability table for the frame IMG. In this way, a precise probability table can be created to match the actual distribution of syntax elements it describes. Step 206 is performed to choose one optimized loop filter strength. Step 208 is performed to apply loop filtering with the chosen filter strength to block boundaries. The second-stage encoding flow is intended to perform entropy encoding (e.g., arithmetic encoding) upon frame header and tiles of the frame IMG. Step 210 is performed to generate a bitstream of a frame header, where the frame header includes frame type, filter strength, probability table, etc. Step 212 is performed to pack all tiles in the frame IMG. Specifically, for each of the tiles, step 212 is performed to pack all superblocks in the tile. Step 214 is performed to do probability backward adaptation for modifying the probabilities according to the trends. As a person skilled in the art can readily understand details of the typical two-stage encoding scheme proposed by the VP9 coding standard, further description is omitted here for brevity.

The encoding circuit 102 is configured to deal with a first-stage encoding flow of a two-stage encoding scheme used for encoding each frame, and the packing circuit 104 is configured to deal with a second-stage encoding flow of the two-stage encoding scheme, where the second-stage encoding flow follows the first-stage encoding flow, and entropy encoding is included in the second-stage encoding flow only. Hence, the packing operation (e.g., arithmetic coding operation) is performed after the first-stage encoding flow finishes processing the whole frame IMG. In this embodiment, the encoding circuit 102 performs steps 202-208 of the first-stage encoding flow shown in FIG. 2 and an additional step 302 shown in FIG. 3, and the packing circuit 104 performs steps 210-214 of the second-stage encoding flow shown in FIG. 2 and an additional step 304 shown in FIG. 3.

Figure 3:
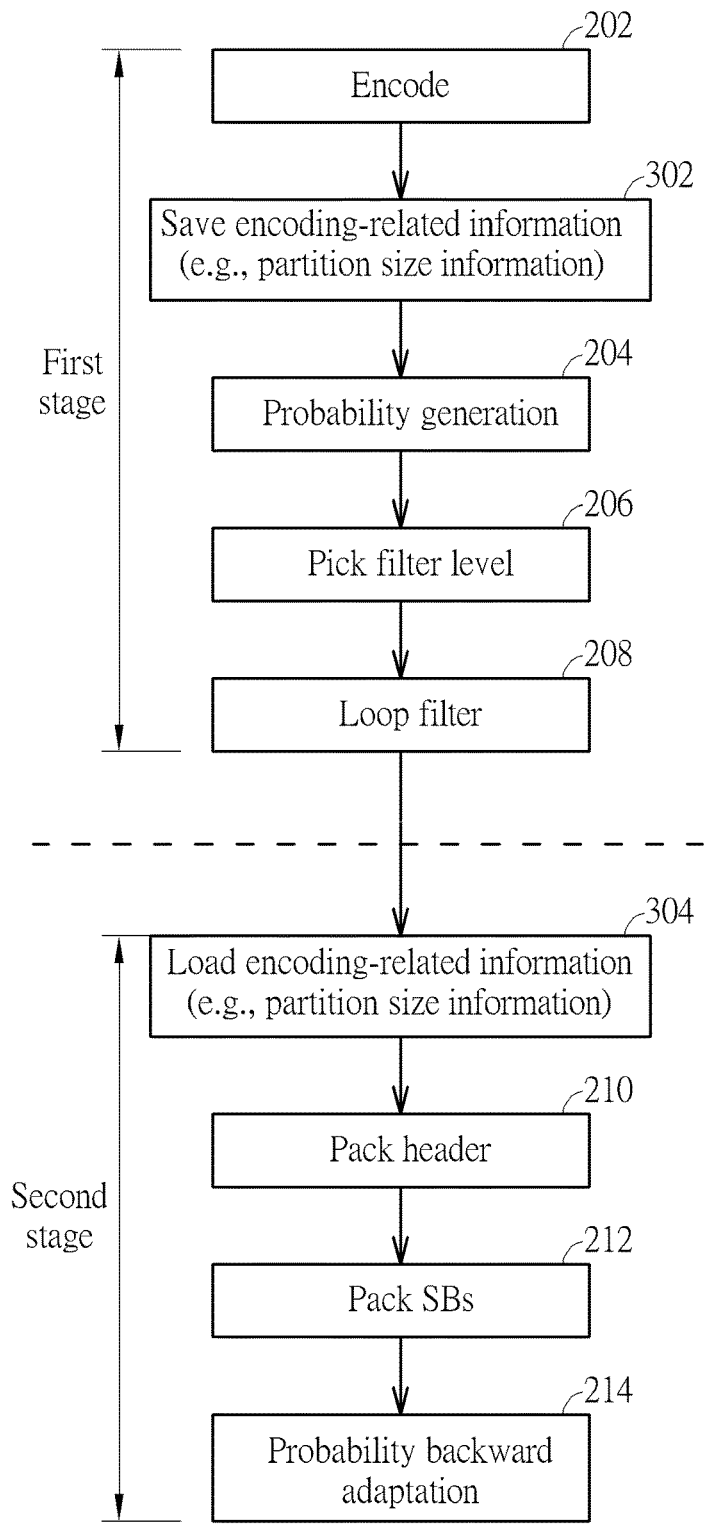
FIG. 3 is a flowchart illustrating a proposed two-stage encoding scheme according to an embodiment of the present invention.

Please refer to FIG. 3, which is a flowchart illustrating a proposed two-stage encoding scheme according to an embodiment of the present invention. Step 302 is performed to store encoding-related information $INF_{PS}$ into the storage device 106. Step 304 is performed to read the encoding-related information $INF_{PS}$ from the storage device 106. For example, the frame IMG is divided into a plurality of tiles, and each of the tiles is composed of a plurality of blocks (e.g., superblocks for VP9). Hence, the encoding circuit 102 may store encoding-related information derived from blocks in a last block row (i.e., a bottom-most row) of a first tile of the frame IMG into the storage device 106, and the packing circuit 104 may read the encoding-related information from the storage device 106, and performs entropy encoding (e.g., arithmetic coding) upon blocks in a first block row (i.e., a top-most row) of a second tile of the frame IMG based at least partly on the encoding-related information read from the storage device 106, where the first tile and the second tile are successive tiles in the same tile column, and the first block row of the second tile is vertically adjacent to the last block row of the first tile. Ina case where the apparatus 100 is used to generate the bitstream BS complying with the VP9 coding standard, the frame IMG is divided into 64×64-sized blocks (or called superblocks $SB_{64\times64}$), each of the tiles in the frame IMG is composed of superblocks $SB_{64\times64}$, and each of the block rows in one tile is a superblock row composed of superblocks $SB_{64\times64}$.

Figure 4:
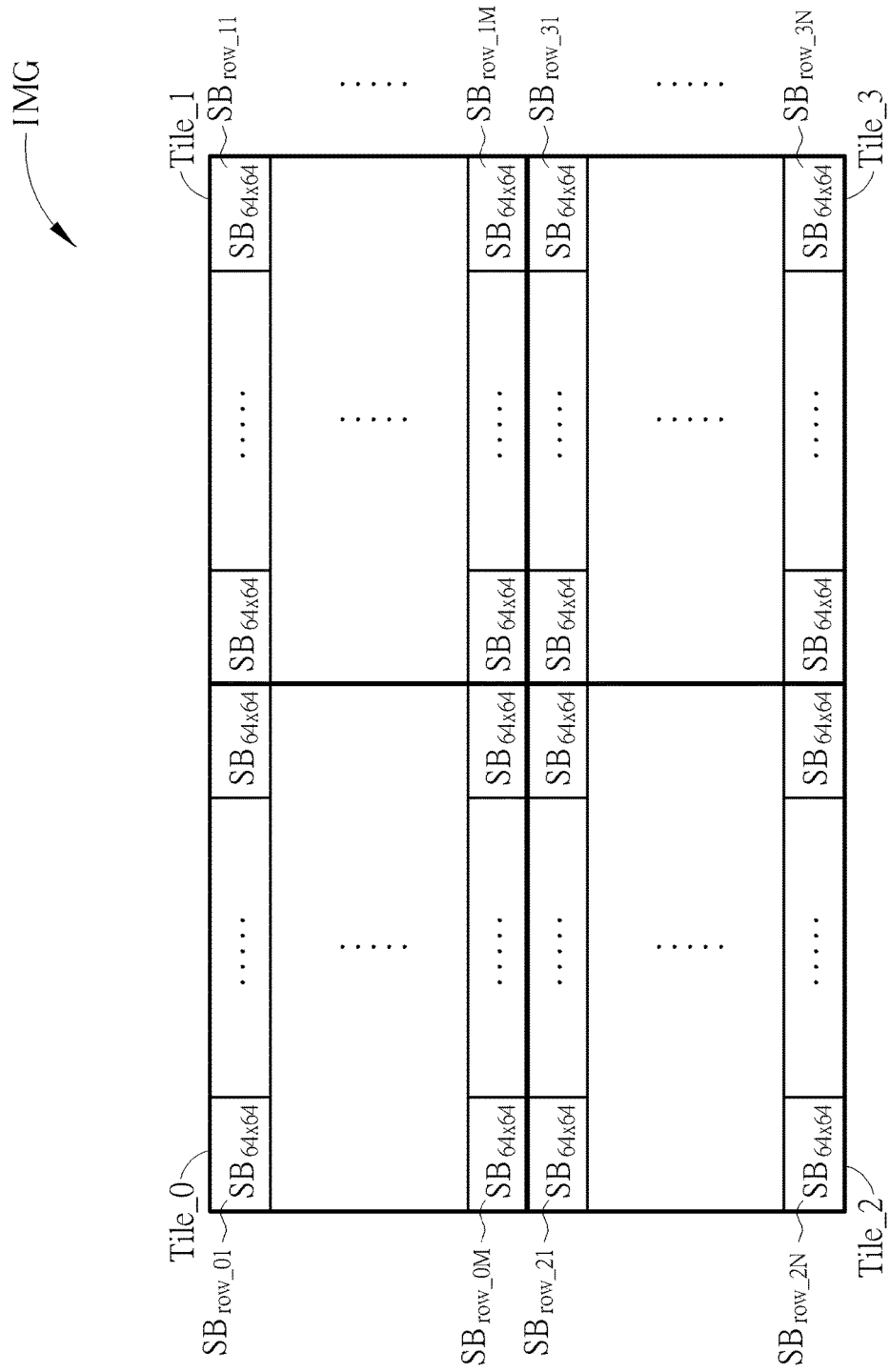
FIG. 4 is a diagram illustrating a tile partitioning layout of a frame to be encoded by the apparatus shown in FIG. 1 according to an embodiment of the present invention.

FIG. 4 is a diagram illustrating a tile partitioning layout of a frame according to an embodiment of the present invention. As shown in FIG. 4, the frame IMG has two tile columns and two tile rows, and therefore includes four tiles Tile_0, Tile_1, Tile_2, and Tile_3. The tiles Tile_0 and Tile_1 in the upper tile row of the frame IMG are horizontally adjacent to each other, and the tiles Tile_2 and Tile_3 in the lower tile row of the frame IMG are horizontally adjacent to each other. Further, the tiles Tile_0 and Tile_2 in the left tile column of the frame IMG are vertically adjacent to each other, and the tiles Tile_1 and Tile_3 in the right tile column of the frame IMG are vertically adjacent to each other. Assuming that the apparatus 100 is used to generate the bitstream complying with the VP9 coding standard, the encoding circuit 102 divides the frame IMG into 64×64-sized blocks, i.e., superblocks $SB_{64\times64}$. The tiles Tile_0-Tile_3 may be processed in a raster scan order, and superblocks $SB_{64\times64}$ in each tile are processed in a raster scan order. The tile Tile_0 includes a plurality of superblock rows $SB_{row\_01}$-$SB_{row\_0M}$, each having a plurality of superblocks $SB_{64\times64}$; the tile Tile_1 includes a plurality of superblock rows $SB_{row\_11}$-$SB_{row\_1M}$, each having a plurality of superblocks $SB_{64\times64}$; the tile Tile_2 includes a plurality of superblock rows $SB_{row\_21}$-$SB_{row\_2N}$, each having a plurality of superblocks $SB_{64\times64}$; and the tile Tile_3 includes a plurality of superblock rows $SB_{row\_31}$-$SB_{row\_3N}$, each having a plurality of superblocks $SB_{64\times64}$. The value of M depends on the height of the upper tile row, and the value of N depends on the height of the lower tile row.

It should be noted that the tile partitioning layout shown in FIG. 4 is for illustrative purposes only, and is not meant to be a limitation of the present invention. In practice, there may be some limitations or requirements of tiling. First of all, each of the number of tile rows and the number of tile columns should be in the power of two (e.g. $2^n$, where the notation n" can be an integer that is greater than or equal to zero), where during tiling, a frame may be divided by any of 2, 4, 8, etc., vertically or horizontally. In addition, each of the minimum width and the minimum height of a tile is equivalent to 256 pixels. For example, a "1280×720" frame which comprises (1280*720) pixels can be divided to (4*2) tiles in maximum. In another example, a "1920×1080" frame which comprises (1920*1080) pixels can be divided to (4*4) tiles in maximum. Typically, it is required for the apparatus 100 at the encoder side to add offsets of all tiles in a frame to the frame header of this frame, so that an apparatus at the decoder side may locate all sub-streams of tiles after extracting/parsing the frame header.

VP9 supports quad-tree based encoding. Hence, recursive partitioning may be employed by the encoding circuit 102 to split each superblock $SB_{64\times64}$ in the frame IMG into one or more partitions (e.g., smaller-sized superblocks) for coding. For example, partitions supported by VP9 coding standard may include square partitions, such as a 64×64-sized block (or called a superblock $SB_{64\times64}$), a 32×32-sized block (or called a superblock $SB_{32\times32}$), a 16×16-sized block (or called a superblock $SB_{16\times16}$), a 8×8-sized block (or called superblock $SB_{8\times8}$), etc., and further include non-square partitions, such as a 64×32-sized block (or called a superblock $SB_{32\times64}$), a 32×64-sized block (or called a superblock $SB_{32\times64}$), 32×16-sized block (or called a superblock $SB_{32\times16}$), a 16×32-sized block (or called a superblock $SB_{16\times32}$), etc. Hence, the partition sizes may include 64×64, 32×32, 16×16, 8×8, 64×32, 32×64, 32×16, 16×32, etc. More specifically, any partition determined from applying recursive partitioning to each superblock $SB_{64\times64}$ in the frame IMG may be regarded as a coding unit.

As can be seen from FIG. 4, the last superblock row $SB_{row\_0M}$ of the tile Tile_0 is vertically adjacent to the first superblock row $SB_{row\_21}$ of the tile Tile_2, and the last superblock row $SB_{row\_1M}$ of the tile Tile_1 is vertically adjacent to the first superblock row $SB_{row\_31}$ of the tile Tile_3. In the packing stage, there are dependencies between adjacent tiles in the same tile column, especially the vertically-adjacent superblock rows belonging to different tiles in the same tile column.

Figure 5:
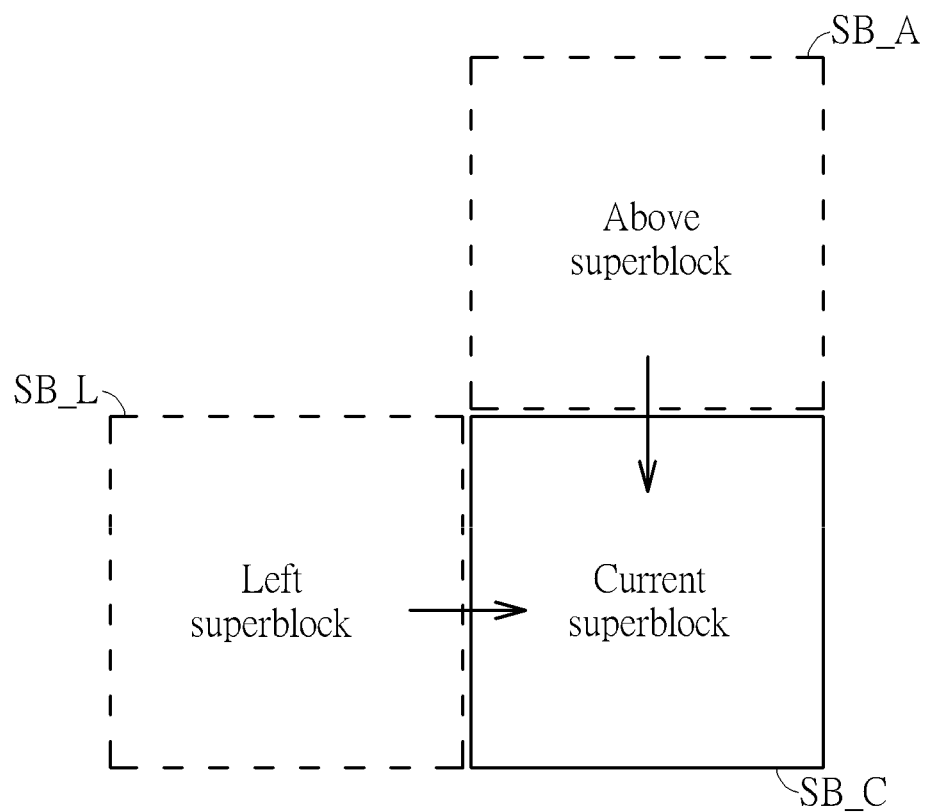
FIG. 5 illustrates some adjacent superblocks associated with packing of the current superblock according to an embodiment of the present invention.

FIG. 5 illustrates some adjacent superblocks associated with packing of the current superblock according to an embodiment of the present invention. The superblocks SB_A, SB_L, and SB_C may be partitions determined by aforementioned recursive partitioning applied to superblock(s) $SB_{64\times64}$. In accordance with VP9 coding standard, when packing/coding a specific syntax element (e.g., a partition type) of a current superblock SB_C, the packing circuit 104 may need encoding-related information (e.g., partition sizes) of its above and left ones, such as the above superblock SB_A and the left superblock SB_L shown in FIG. 5. For example, different partition types may be categorized into a horizontal partition type (2N×N), a vertical partition type (N×2N), and a square-size partition type (N×N). When coding the partition type of the current superblock SB_C, the packing circuit 104 has to know partition sizes of the above superblock SB_A and the left superblock SB_L. As mentioned above, the encoding circuit 102 is capable of generating a probability table for each frame by counting occurrence of each syntax element in the frame. A table index Prob_offset used for loading a probability set (i.e., a probability model) from the probability table may be determined based on corresponding partition sizes of at least one above superblock and at least one left superblock. The computation of the table index Prob_offset corresponding to encoding of the partition type of the current superblock SB_C may be expressed as follows.

Prob_offset=offset_above+offset_left*2;

where the parameters offset_above and offset_left can be derived by comparing the partition sizes of the above superblock SB_A and the left superblock SB_L with the partition size of the current superblock SB_C, respectively. For example, if any of above adjacent partitions to the current superblock SB_C (i.e., any adjacent partition that is above the current superblock SB_C) has a smaller width than that of the current superblock SB_C, the parameter offset_above is set by 1; otherwise, the parameter offset_above is set by 0. In another example, if any of left adjacent partitions to the current superblock SB_C (i.e., any left partition that is at the left side of the current superblock SB_C) has a smaller height than that of the current superblock SB_C, the parameter offset_left is set by 1; otherwise, the parameter offset_left is set by 0. However, if the left superblock SB_L and the current superblock SB_C are located in different tiles, the parameter offset_left is set by 0. Please note that, even if an above partition is located in a different tile (i.e. a tile that is different from the tile where the current superblock SB_C is located), the reference is still valid.

When the current superblock SB_C is a partition included in a first superblock row of a second tile and the above superblock SB_A is a partition included in a last superblock row of a first tile that is vertically adjacent to the first superblock row of the second tile, there are dependencies (e.g., partition size dependency) between successive tiles in the same tile column. Since vertically-adjacent tiles in the same tile column have dependencies in packing, packing operations of these tiles cannot be done in parallel. For example, a typical video encoder of the related art may pack tiles of the same frame in a raster scan order, and pack superblocks of the same tile in a raster scan order.

To achieve parallelism of packing vertically-adjacent tiles in the same tile column, the present invention therefore proposes saving encoding-related information $INF_{PS}$ derived from blocks in a last block row in a specific tile into the storage device 106 during a first-stage encoding flow of a two-stage encoding scheme, and loading the encoding-related information $INF_{PS}$ from the storage device 106 during a second-stage encoding flow of the two-stage encoding scheme. In a case where the apparatus 100 is used to generate the bitstream BS complying with the VP9 coding standard, the encoding-related information $INF_{PS}$ may include partition size information of partitions (i.e., partition sizes of superblocks determined by recursive partitioning) in the last superblock row of a first tile that will be needed for packing partition types of partitions (i.e., superblocks determined by recursive partitioning) in the first superblock row of a second tile, where the last superblock row of the first tile is vertically adjacent to the first superblock row of the second tile. The encoding-related information $INF_{PS}$ loaded from the storage device 106 may serve as initial context for the second-stage encoding flow. Hence, based on the initial context provided by the encoding circuit 102 and saved in the storage device 106, the packing circuit 104 is not required to follow the raster scan order to pack tiles in the frame IMG.

Figure 6:
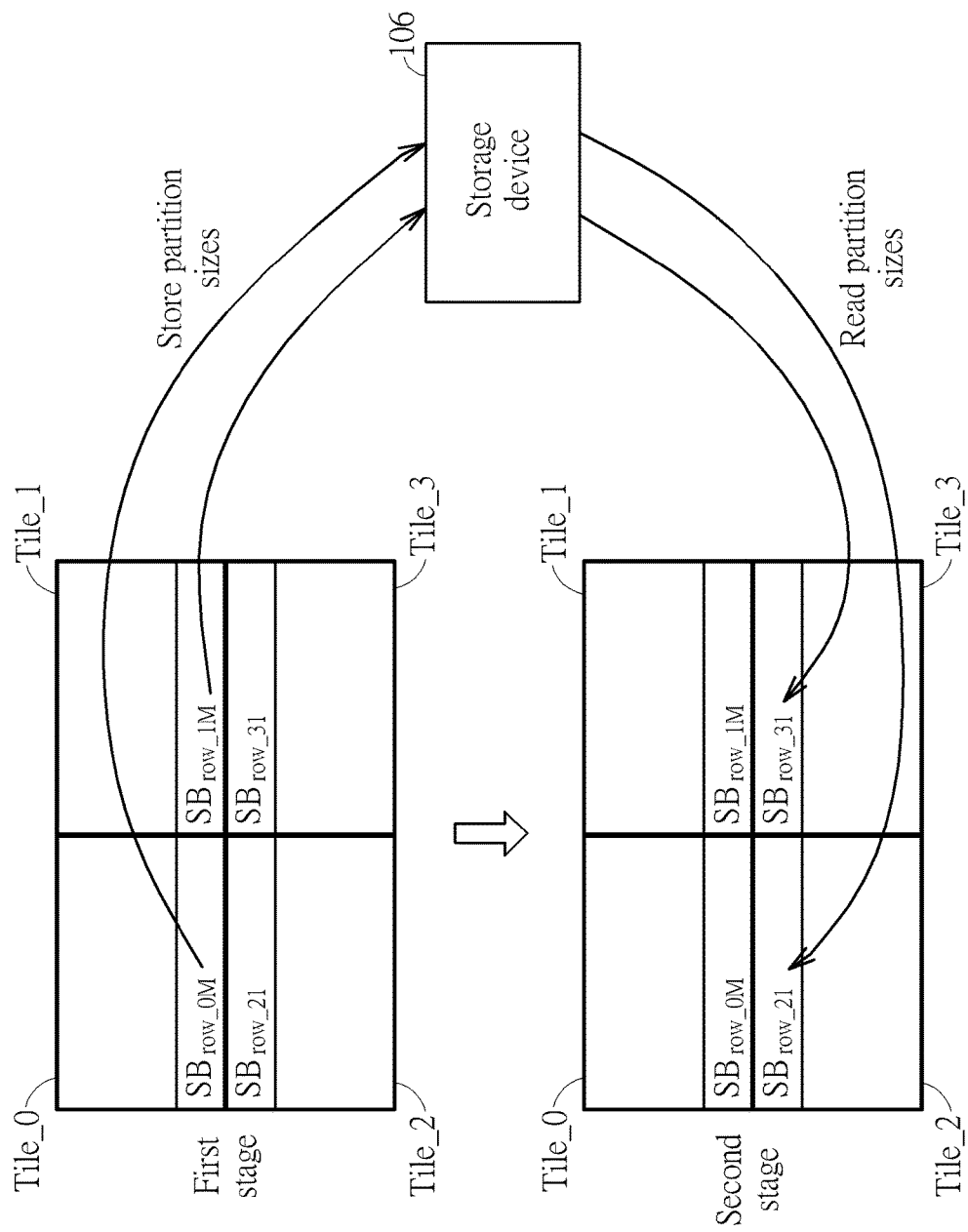
FIG. 6 is a diagram illustrating the operation of storing encoding-related information in a first-stage encoding flow and the operation of reading/loading encoding-related information in a second-stage encoding flow according to an embodiment of the present invention.

FIG. 6 is a diagram illustrating the operation of storing encoding-related information in a first-stage encoding flow and the operation of reading/loading encoding-related information in a second-stage encoding flow according to an embodiment of the present invention. Let's take the frame IMG with the exemplary tile partitioning layout as shown in FIG. 4 for example. When performing the proposed first-stage encoding flow shown in FIG. 3, the encoding circuit 102 further stores the encoding-related information $INF_{PS}$, including partition size information of superblocks in the superblock row $SB_{row\_0M}$ and partition size information of superblocks in the superblock row $SB_{row\_1M}$, into the storage device 106 (which may act as a superblock information buffer). When performing the proposed second-stage encoding flow shown in FIG. 3, the packing circuit 104 further reads the stored encoding-related information $INF_{PS}$, including partition size information of superblocks in the superblock row $SB_{row\_0M}$ and partition size information of superblocks in the superblock row $SB_{row\_1M}$, from the storage device 106, and performs packing (e.g., arithmetic coding) upon superblocks in the superblock rows $SB_{row\_21}$ and $SB_{row\_31}$ based at least partly on the encoding-related information $INF_{PS}$ read from the storage device 106.

In one exemplary design, the packing circuit 104 starts the packing of the first superblock $SB_{row\_21}$ of the tile Tile_2 before the packing of the last superblock $SB_{row\_0M}$ of the tile Tile_0 located above the tile Tile_2 is accomplished, and/or starts the packing of the first superblock $SB_{row\_31}$ of the tile Tile_3 before the packing of the last superblock $SB_{row\_1M}$ of the tile Tile_1 located above the tile Tile_3 is accomplished. Hence, the packing circuit 104 is not required to pack the tiles Tile_0, Tile_1, Tile_2, and Tile_3 in a raster scan order.

In another exemplary design, the packing circuit 104 performs the packing of the first superblock $SB_{row\_21}$ of the tile Tile_2 and the packing of the last superblock $SB_{row\_0M}$ of the tile Tile_0 located above the tile Tile_2 in parallel, and/or performs the packing of the first superblock $SB_{row\_31}$ of the tile Tile_3 and the packing of the last superblock $SB_{row\_1M}$ of the tile Tile_1 located above the tile Tile_3 in parallel. For example, the packing circuit 104 starts the packing of the first superblock $SB_{row\_21}$ of the tile Tile_2 and the packing of the last superblock $SB_{row\_0M}$ of the tile Tile_0 located above the tile Tile_2 at the same time, and/or starts the packing of the first superblock $SB_{row\_31}$ of the tile Tile_3 and the packing of the last superblock $SB_{row\_1M}$ of the tile Tile_1 located above the tile Tile_3 at the same time.

In yet another exemplary design, the packing circuit 104 packs all tiles Tile_0, Tile_1, Tile_2, and Tile_3 of the frame IMG in parallel. For example, the packing circuit 104 starts the packing of tile Tile_0, the packing of tile Tile_1, the packing of tile Tile_2, and the packing of tile Tile_3 at the same time. In this way, an optimized encoding performance can be achieved.

In above embodiments, it is assumed that the video coding standard is the VP9 coding standard. However, this is for illustrative purposes only, and is not meant to be a limitation of the present invention. Any existing video coding standard supporting a two-stage encoding scheme and a frame tiling scheme may be modified to adopt the proposed design to achieve parallelism of packing (entropy encoding) tiles in the same tile column. Further, any developing video coding standard supporting a two-stage encoding scheme and a frame tiling scheme may adopt the proposed design to achieve parallelism of packing (entropy encoding) tiles in the same tile column. These all fall within the scope of the present invention.

It should be noted that the present invention has no limitations on the data format of the encoding-related information $INF_{PS}$ stored in the storage device 106. In one exemplary design, the encoding circuit 102 may transmit the encoding-related information $INF_{PS}$ to the storage device 106 directly, and the packing circuit 104 may receive the encoding-related information $INF_{PS}$ from the storage device 106 directly. In another exemplary design, the encoding circuit 102 may translate/convert the encoding-related information $INF_{PS}$ into a translated/converted data set, and transmit the translated/converted data set to the storage device 106; and the packing circuit 104 may receive the translated/converted data set from the storage device 106, and process the translated/converted data set to recover the encoding-related information $INF_{PS}$.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for video encoding a frame divided into a plurality of tiles, each having a plurality of blocks, the method comprising:

storing encoding-related information derived from a plurality of blocks in a last block row of a first tile of the frame into a storage device, wherein the encoding-related information comprises a plurality of encoding-related data derived from the blocks in the last block row of the first tile, respectively;

reading the encoding-related information from the storage device; and performing entropy encoding upon blocks in a first block row of a second tile of the frame based at least partly on the encoding-related information read from the storage device;

wherein the first block row of the second tile is vertically adjacent to the last block row of the first tile, and the entropy encoding of the first block row of the second tile is started before entropy encoding of the last block row of the first tile is accomplished;

wherein the encoding-related information is stored in the storage device before the entropy encoding is performed upon any block in the frame;

wherein the frame is encoded using a first-stage encoding flow and a second-stage encoding flow following the first-stage encoding flow; each of the first-stage encoding flow and the second-stage encoding flow is applied to all blocks within the frame; entropy encoding is performed in the second-stage encoding flow only; the step of storing the encoding-related information into the storage device is performed in the first-stage encoding flow; and the step of reading the encoding-related information from the storage device is performed in the second-stage encoding flow;

wherein the first-stage encoding flow comprises generating a probability table for the frame; each of the blocks in the last block row of the first tile and the blocks in the first block row of the second tile is split into one or more partitions for coding; and the step of performing the entropy encoding upon blocks in the first block row of the second tile comprises:

when encoding a syntax element of a current partition in the first block row of the second tile, determining a table index based at least partly on encoding-related information of at least one specific partition in the last block row of the first tile, wherein the at least one specific partition is located above the current partition; and selecting a probability set from the probability table for encoding the syntax element of the current partition according to the table index.

2. The method of claim 1, wherein the entropy encoding is arithmetic coding.

3. The method of claim 1, wherein the entropy encoding of the first block row of the second tile and entropy encoding of a first block row of the first tile are performed in parallel.

4. The method of claim 1, wherein the encoding-related information of the at least one specific partition includes partition size information of the at least one specific partition.

5. The method of claim 1, wherein the syntax element of the current partition is a partition type of the current partition.

6. The method of claim 1, wherein each of the blocks in the last block row of the first tile and the blocks in the first block row of the second tile is a superblock (SB) specified in a VP9 coding standard.

7. The method of claim 1, wherein the encoding-related information stored into the storage device includes partition size information of partitions in the last block row of the first tile.

8. The method of claim 7, wherein each of the blocks in the last block row of the first tile and the blocks in the first block row of the second tile is a superblock (SB) specified in a VP9 coding standard.

9. An apparatus for video encoding a frame divided into a plurality of tiles, each having a plurality of blocks, comprising:

a storage device;

an encoding circuit, configured to store encoding-related information derived from a plurality of blocks in a last block row of a first tile of the frame into the storage device, wherein the encoding-related information comprises a plurality of encoding-related data derived from the blocks in the last block row of the first tile, respectively; and a packing circuit, configured to read the encoding-related information from the storage device, and perform entropy encoding upon blocks in a first block row of a second tile of the frame based at least partly on the encoding-related information read from the storage device;

wherein the first block row of the second tile is vertically adjacent to the last block row of the first tile, and the packing circuit starts the entropy encoding of the first block row of the second tile before entropy encoding of the last block row of the first tile is accomplished;

wherein the encoding-related information is stored in the storage device before the entropy encoding is performed upon any block in the frame;

wherein the apparatus is configured to encode the frame by using a first-stage encoding flow and a second-stage encoding flow following the first-stage encoding flow; each of the first-stage encoding flow and the second-stage encoding flow is applied to all blocks within the frame; entropy encoding is performed in the second-stage encoding flow only; the encoding circuit is configured to deal with the first-stage encoding flow; and the packing circuit is configured to deal with the second-stage encoding flow;

wherein the encoding circuit is configured to generate a probability table for the frame when performing the first-stage encoding flow; each of the blocks in the last block row of the first tile and the blocks in the first block row of the second tile is split into one or more partitions for coding; and when encoding a syntax element of a current partition in the first block row of the second tile in the second-stage encoding flow, the packing circuit is configured to determine a table index based at least partly on encoding-related information of at least one specific partition in the last block row of the first tile, and select a probability set from the probability table for encoding the syntax element of the current partition according to the table index, where the at least one specific partition is located above the current partition.

10. The apparatus of claim 9, wherein the entropy encoding performed by the packing circuit is arithmetic coding.

11. The apparatus of claim 9, wherein the packing circuit is configured to perform the entropy encoding of the first block row of the second tile and entropy encoding of a first block row of the first tile in parallel.

12. The apparatus of claim 9, wherein the encoding-related information of the at least one specific partition includes partition size information of the at least one specific partition.

13. The apparatus of claim 9, wherein the syntax element of the current partition is a partition type of the current partition.

14. The apparatus of claim 9, wherein each of the blocks in the last block row of the first tile and the blocks in the first block row of the second tile is a superblock (SB) specified in a VP9 coding standard.

15. The apparatus of claim 9, wherein the encoding-related information stored into the storage device includes partition size information of partitions in the last block row of the first tile.

16. The apparatus of claim 15, wherein each of the blocks in the last block row of the first tile and the blocks in the first block row of the second tile is a superblock (SB) specified in a VP9 coding standard.

17. A method for video encoding a frame divided into a plurality of tiles, each having a plurality of blocks, the method comprising:
- storing encoding-related information derived from blocks in a last block row of a first tile of the frame into a storage device;
- reading the encoding-related information from the storage device; and
- performing entropy encoding upon blocks in a first block row of a second tile of the frame based at least partly on the encoding-related information read from the storage device;
- wherein the first block row of the second tile is vertically adjacent to the last block row of the first tile, and the entropy encoding of the first block row of the second tile is started before entropy encoding of the last block row of the first tile is accomplished;
- wherein the frame is encoded using a first-stage encoding flow and a second-stage encoding flow following the first-stage encoding flow; each of the first-stage encoding flow and the second-stage encoding flow is applied to all blocks within the frame; entropy encoding is performed in the second-stage encoding flow only; the step of storing the encoding-related information into the storage device is performed in the first-stage encoding flow; and the step of reading the encoding-related information from the storage device is performed in the second-stage encoding flow;
- wherein the first-stage encoding flow comprises generating a probability table for the frame; each of the blocks in the last block row of the first tile and the blocks in the first block row of the second tile is split into one or more partitions for coding; and the step of performing the entropy encoding upon blocks in the first block row of the second tile comprises:
- when encoding a syntax element of a current partition in the first block row of the second tile, determining a table index based at least partly on encoding-related information of at least one specific partition in the last block row of the first tile, wherein the at least one specific partition is located above the current partition; and
- selecting a probability set from the probability table for encoding the syntax element of the current partition according to the table index.

* * * * *